(Model.)

G. P. CONANT.
PITMAN BAR.

No. 249,011. Patented Nov. 1, 1881.

WITNESSES:
Theo. G. Hoster
C. Sedgwick

INVENTOR:
G. P. Conant
BY Munn & Co
ATTORNEYS.

UNITED STATES PATENT OFFICE.

GEORGE P. CONANT, OF GENEVA LAKE, WISCONSIN.

PITMAN-BAR.

SPECIFICATION forming part of Letters Patent No. 249,011, dated November 1, 1881.

Application filed June 30, 1881. (Model.)

*To all whom it may concern:*

Be it known that I, GEORGE P. CONANT, of Geneva Lake, Walworth county, Wisconsin, have invented a new and Improved Pitman-Bar, of which the following is a specification.

Ordinarily pitman bars or rods are connected with the shaft by means of a crank at the end of the shaft, or to cranks formed by bending the shaft. By this arrangement the whole body of the pitman-bar is carried with the crank, causing a considerable loss of power and an undesirable jarring or shaking effect, due to the centrifugal force of the pitman-bar, and when running at high rates of speed the centrifugal force of the pitman becomes injurious, causing the whole shaft to vibrate.

The object of my invention is to overcome this difficulty, and also to provide a pitman-connection which may be attached to a straight shaft at any point in its length; and to these ends my invention consists, principally, of a pitman-head formed with cross-slots, in combination with a crank adapted to be secured upon the shaft, the crank-pin of which is adapted to move in one of said slots of the pitman-head, the other slot thereof being to accommodate the backward-and-forward movement of the pitman and pitman-head in a right line upon the shaft, the crank-pin being provided with a sliding block, so that the pin will pass the slot for the shaft.

Figure 1:
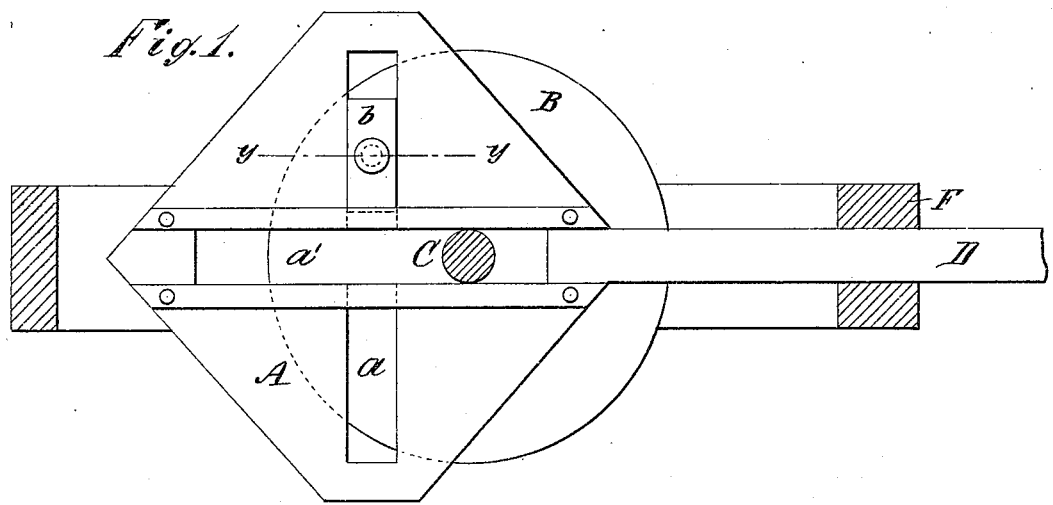
Figure 2:
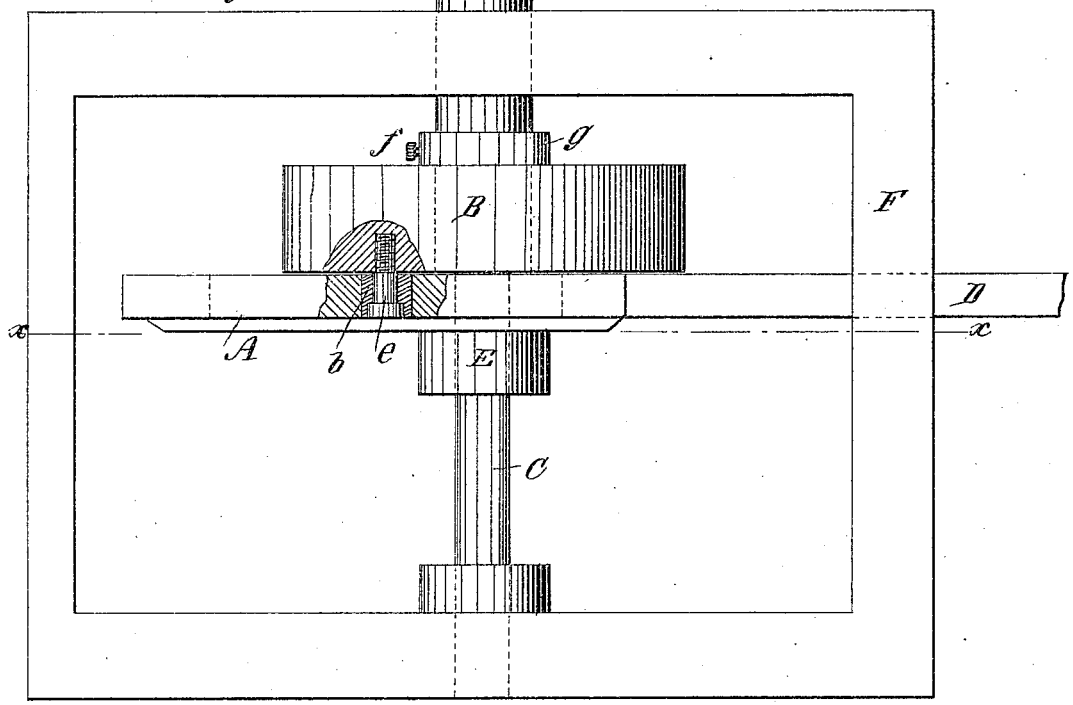

In the accompanying drawings, Figure 1 is a section taken on the line $x\ x$, Fig. 2; and Fig. 2 is a plan view of my invention, partly in section.

Similar letters of reference indicate corresponding parts.

A represents the pitman-head, and B represents the crank. The pitman-head is formed with the slots $a\ a'$, which cut each other at right angles. The slot $a'$ is of such size that it will clear the shaft C, and is of a length equal to or greater than the length of the crank. The slot $a$ must be of greater length than the length of the crank, so as to accommodate the sliding block $b$, which is placed upon the crank-pin $e$ and moves in said slot; and the block $b$ must be of greater length than the width of the slot $a'$, so as to carry the crank-pin smoothly past it as the crank revolves. By this construction and arrangement of the parts, it will be observed that the weight of the pitman is not a load upon the crank, and that the rear end of the pitman D is not carried around by the crank, but moves in a direct line through the guide F, and produces no vibration or shaking of the shaft, as is the case when connected in the ordinary way. The crank B is secured upon the shaft by means of the set-screw $f$, which passes through the collar $g$ of the crank, and by loosening the screw it may be moved to any point desired in the shaft. The pitman-head is held in place upon the shaft by the movable collar E, so that it may also be moved with the pitman to any desired point in the shaft.

Having thus described my invention, I claim as new and desire to secure by Letters Patent—

1. The pitman-head A, formed with the slots $a\ a'$ at right angles to each other, in combination with the crank B and the sliding block $b$, substantially as and for the purposes set forth.

2. The movable crank B, having the sliding block $b$, in combination with the movable pitman-head A, formed with the slots $a\ a'$, and the pitman D, moving through the guide F, substantially as and for the purposes set forth.

GEORGE PUTMAN CONANT.

Witnesses:
ALBERT E. LYTLE,
WM. R. NETHERCUT.